United States Patent [19]

Shorter

[11] Patent Number: 4,949,254
[45] Date of Patent: Aug. 14, 1990

[54] METHOD TO MANAGE CONCURRENT EXECUTION OF A DISTRIBUTED APPLICATION PROGRAM BY A HOST COMPUTER AND A LARGE PLURALITY OF INTELLIGENT WORK STATIONS ON AN SNA NETWORK

[75] Inventor: David U. Shorter, Lewisville, Tex.

[73] Assignee: IBM Corp., Armonk, N.Y.

[21] Appl. No.: 250,598

[22] Filed: Sep. 29, 1988

[51] Int. Cl.$^5$ .................. G06F 12/08; G06F 13/42
[52] U.S. Cl. .......................... 364/200; 364/232.1; 364/240.8; 364/242.94
[58] Field of Search ............... 364/200, 300, 900

[56] References Cited

U.S. PATENT DOCUMENTS 4,742,447  5/1988  Duvall et al. ............... 364/200

OTHER PUBLICATIONS

An Introduction to Advanced Program-to-Program Communication (APPC), GG24-1584-01.
Systems Network Architecture-Concepts and Products, GC30-3072-3.
Systems Network Architecture-Transaction Programmer's Reference Manual for LU Type 6.2, GC30-3084-2.
Systems Network Architecture-Technical Overview, GC30-3073-2.

Primary Examiner—Raulfe B. Zache
Attorney, Agent, or Firm—Richard E. Cummins; James H. Barksdale

[57] ABSTRACT

A method for processing a distributed application program in a SNA type network having a host processor executing a virtual machine type operating system and a relatively large plurality of terminals, in which a plurality of run ready virtual machines are established at the host and primed by pre-initializing each machine with the host resident portion of the application program under the control of a Virtual Machine Pool Manager that was previously created. Primed virtual machines are assigned to process requests from the terminals for LU 6.2 type conversation with the application program since the virtual machine is pre-initialized the request is immediately accepted for processing. At the end of the conversation the primed machine is returned to the pool of primed machines to await the processing another request. The Pool Manager is provided with a control strategy which determines the number of primed virtual machines that are in the pool during any period of time. The control strategy is implemented by reference to a stored mathematical algorithm that reflects anticipated demand for the application program.

14 Claims, 8 Drawing Sheets

| | |
|---|---|
| END USER | PROGRAMS FOR END USER |
| NAU SERVICES | MANAGE NETWORK<br>SESSION SERVICES<br>PRESENTATION SERVICES |
| DATA FLOW CONTROL | MAINTAIN SEND-RECEIVE<br>MODES. HIGH LEVEL<br>ERROR CORRECTING |
| TRANSMISSION CONTROL | SESSION LEVEL PACING<br>ENCRYPTION AND DECRYPTION |
| PATH CONTROL | ROUTING<br>SEGMENTING DATA UNITS<br>VIRTUAL ROUTE PACING |
| DATA LINK | ERROR CONTROL, LINK LEVEL<br>ADDRESS SEQUENCING |
| PHYSICAL | SIGNAL CHARACTERISTICS OF<br>CONNECTOR PIN ASSIGNMENTS |

FIG. 3

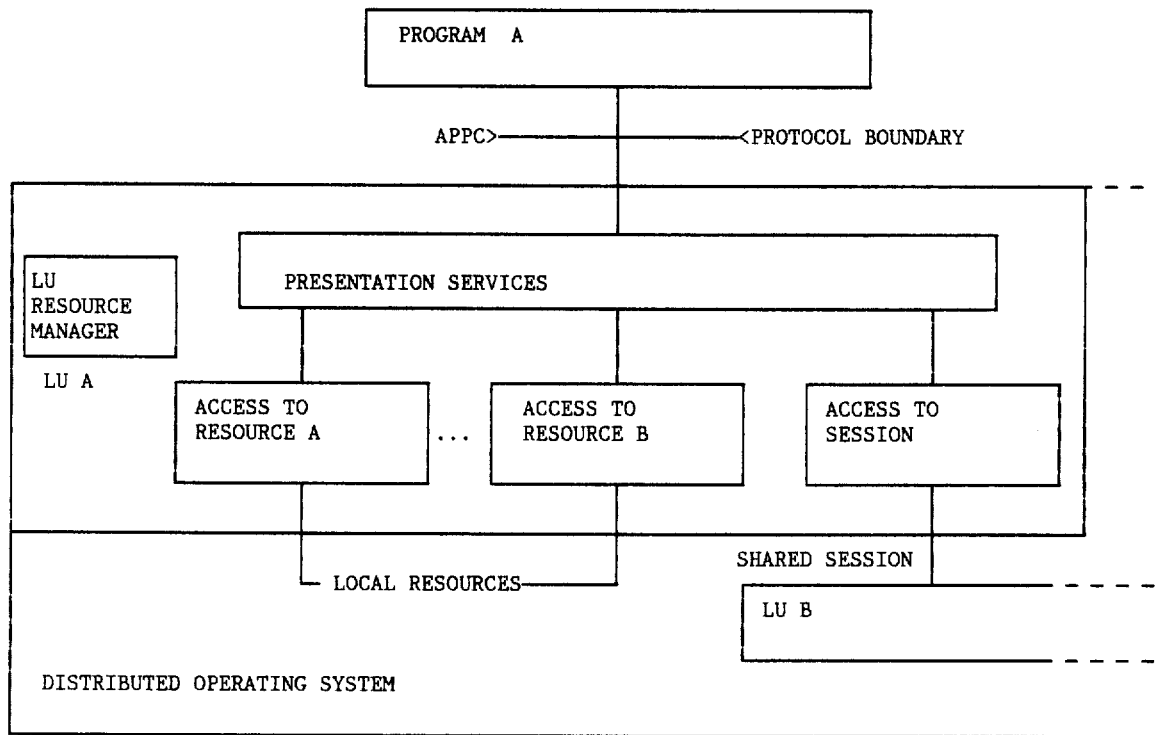

FIG. 4A

| VMNAME | TPNNAME | USERID | PCID | IDIC | CONVID |
|---|---|---|---|---|---|
| VMABC0001 | MAIL | | | NO | |
| VMABC0002 | MAIL | | | NO | |
| VMABC0003 | MAIL | | | NO | |
| VMABC0004 | MAIL | | | NO | |
| | | | | NO | |
| VMABC000n | MAIL | | | NO | |

METHOD TO MANAGE CONCURRENT EXECUTION OF A DISTRIBUTED APPLICATION PROGRAM BY A HOST COMPUTER AND A LARGE PLURALITY OF INTELLIGENT WORK STATIONS ON AN SNA NETWORK

CROSS REFERENCE TO RELATED APPLICATIONS

U.S. application Ser. No. 261,861, entitled "Method to Provide Concurrent Execution of Distributed Application Programs by a Host Computer and an Intelligent Work Station on an SNA Network" which filed Oct. 24, 1988 and is assigned to the Assignee of the present invention, is directed to a method for executing LU 6.2 conversations for distributed application programs which involves creating a pool of virtual machines at the host which are maintained in a run ready idle state until assigned by a Virtual Machine Pool Manager to a request, from a terminal executing a first part of a distributed application program, for a conversation with the second part of the application program stored at the host system.

FIELD OF INVENTION

This invention relates in general to inter-program communication methods in data processing networks comprising a host system connected to a plurality of intelligent workstations and in particular to a method for providing improved communications between distributed portions of an application program that is being executed on a network simultaneously by a relatively large number of terminals.

BACKGROUND ART

The prior art discloses a variety of computer networks. The IBM System Journal, Volume 22, Number 4, 1983 includes a series of articles devoted to a review of the IBM System Network Architecture (SNA). On page 345 of that publication a network is defined as "a configuration of terminals, controllers, and processors and the links that connect them. When such a configuration supports user applications involving data processing and information exchange and conforms to the specifications of the System Network Architecture it is called an SNA network. Essentially SNA defines logical entities that are related to the physical entities in a network and specifies the rules for interactions among these logical entities.

The logical entities of an SNA network include network addressable units and the path control network that connects them. Network addressable units communicate with one another using logical connections called "sessions." The three types of Network Addressable Units (NAUs) are the Logical Unit (LU), the Physical Unit (PU), and the System Services Control Point (SSCP) which are defined as follows;

Logical Unit (LU). An LU is a port through which end users may access the SNA network. An end user uses an LU to communicate with another end user and to request services of a System Services Control Point (SSCP).

Physical Unit (PU). A PU is a component that manages the resources of a node in cooperation with an SSCP.

System Services Control Point (SSCP). This is a focal point for configuration management, problem determination and directory services for end users. SSCPs may have sessions with LUs and PUs. When such a session occurs, the LU or PU is in the domain of the SSCP. In addition to sessions with LUs and PUs, SSCPs may also communicate with each other to coordinate the initiation and the termination of sessions between Logical Units and in different domains."

From the hardware standpoint, a simple network comprises a host system having a processing unit and a plurality of remote terminals that are assigned to individual users. The remote terminals are selectively connectable to the host system through one or more communication links. These links may comprise merely a coaxial cable, a dedicated telephone line, or in some cases, a satellite communication link.

The host processing unit most always has an operating system which supports the creation of a large number of virtual machines or the functional equivalents, each of which is assigned, on request, to an end user. A virtual machine processes tasks for the assigned end user, by time sharing the host processor hardware of the host system. Some hosts systems may include more than one hardware processor so that true simultaneous processing occurs at the host since a plurality of processors are running in parallel. More often, there is merely one hardware processor that "concurrently" runs data processing tasks for the virtual machines by a time sharing technique. This is transparent to the end users at the terminals.

Two general types of terminals are employed in data processing networks. The first is referred to as a "dumb terminal" in that it comprises merely a keyboard and a display device and little or no processing capability other than that required to make a connection with the host system. The second type of terminal is referred to as an Intelligent Work Station (IWS) and is provided with its own processor unit, Operating System and supporting peripheral devices. The terms IWS and Personal Computer (PC) are often used interchangeably. With the ready availability of PCs having very attractive price performance characteristics, most new networks are implemented with IWS type terminals and many of the older networks are being modified with the replacement of dumb terminals with IWS type terminals.

Providing each end user on the network with its own processing capability relieves the host CPU from doing many of the data processing tasks that were previously done at the host. The nature of the tasks that are processed by the host CPU therefore has changed and more sophisticated applications such as electronic mail and electronic calendaring are now implemented on the network under the control of the host system. Both of these applications involve what is referred to as distributed application programs, in that one part of the application program is resident on the host system and another is resident on the IWS terminal.

Many of the current data processing networks are designed in accordance with the IBM SNA architecture which was first described in 1974. Since then various new functions and services have been added. As suggested earlier, SNA networks can be viewed as a plurality of nodes interconnected by data links. At each of these nodes, path control elements send information packets, referred to as Path Information Units (PIUs), between resource managers called Logical Units. The logical connections of the paths are called a session. A transport network for data is therefore defined by the path control elements and the data link control elements.

Nodes can be connected by a plurality of links and comprise a plurality of LUs. Various types of LUs sessions and protocols have been established within the framework of the SNA architecture. There are three general classes of sessions. The first class is unspecified by SNA. The second class involves terminals and the third involves program to program communication. For example LU 6 provides SNA defined inter-program communication protocols which avoids the limitations of terminal LU types such as LU 2 and LU 7. LU 6.2 is referred to as Advanced Program to Program Communication or APPC protocols.

Logical Units are more than message ports. LUs provide operating system services such as program to program communication involving one or more local programs. Each application program views the LUs as a local operating system and the network of loosely coupled LUs connected by sessions as a distributed operating system.

The LU allocates a plurality of resources to its programs, which are dependent on the particular hardware and its configuration. Some of the resources that are made available are remote while others are local, i.e., associated with the same LU as the application program. The sessions are considered local resources at each LU, but are shared between particular LUs.

The control function of an LU is resource allocation. Programs ask one for access to a resource. Sessions which carry messages between LUs or programs running on LUs are considered shared resources. A session is divided into a plurality of serially executed conversations.

Two LUs connected by a session have a shared responsibility in allocating sessions to application programs for use as "conversations." The application programs are therefore sometimes referred to as "transaction programs."

The successful connection between LUs occurs as a result of a common set of protocols which function first to activate a session between two LUs and second to facilitate the exchange of message data.

The SNA format and protocol reference manual designated SC30-3112, published by the IBM Corporation describes SNA by defining, for example, with programming language declarations, the format of messages that flow between network entities and the programs that generate, manipulate, translate, send and return messages.

The SNA transaction program reference manual for LU 6.2 referred to as GC30-3084, published by the IBM Corporation defines the verbs that describe the functions provided by the implementing products.

Intelligent work stations that are connected to a SNA type network and employ an LU 6.2 protocol to process an application program that is distributed between the IWS and the host system operate efficiently so long as the operating system of the IWS does not run more than one application concurrently at the terminal. However, if the IWS is operating under an operating system such as OS/2, which allows an IWS such an IBM PS/2 personal computer to run concurrent application programs which are distributed, the advantage of concurrent operation on the PS/2 is lost. The advantage is lost because at the host, the separate transactions which are run concurrently at the terminal become serialized. The serialization of the transaction occurs because the host creates only one virtual machine that is permanently associated with the user ID and the specific terminal as long as the session is active.

In order to avoid the serialization at the host, the second application being run at the terminal has to be run with a different user ID in order to have a separate virtual machine established at the host that will be dedicated solely to the second application.

The invention described in the cross-referenced application is directed to a method to permit two or more distributed applications that are being run concurrently on one intelligent work station of a data processing network to be executed on separate virtual machines created by the host system to prevent the applications from becoming serialized at the host and to allow each to be run concurrently with the other on both the host and the terminal.

With the method of the cross-referenced application, the host system creates a plurality of virtual machines (VMs) that are brought to a run ready state prior to and in anticipation of being assigned to a distributed application program for processing a task which has been defined in said distributed application program, part of which is resident on the host system and the companion part of which is resident on one of the IWS end user terminals. The pool of run ready VM machines are preferably created automatically at the time that the host system is initialized under the control of a pool manager, which is a program resident on the host system, whose other main function is to assign an idle VM machine from the pool in response to an end user request that identifies a distributed application program, a previously assigned Logical Unit name and a USERID. The VM is assigned only for a period of time required to complete one LU 6.2 conversation. At the end of the conversation the VM machine is returned to the pool for subsequent assignment to another, possibly different, application program and user.

The method allows two distributed application programs being executed concurrently on the IWS to run concurrently on the host in two separate virtual machines even though the conversation requests have the same USERID. While the above system improves the processing of distributed application programs, it does not address the problem that arises when a relatively large number of terminal users want to access the same distributed application program at about the same period of time.

An example of this type of problem is a distributed application program which will be called MAIL, whose function is to transfer memos, letters, reports, etc. among the various terminals on the network. Assume the network is similar to some networks currently in commercial use that include upwards of many thousands of users, perhaps 1000 of whom start work about the same time each day at the same location. For a number of different reasons each of these end users may have messages that have been stored in their respective system "Mail Boxes" since the time that the user was last active on the system. When the network is subjected to this peak activity with one distributed application program, the response time is adversely affected since considerable time is spent by the host processor in establishing a virtual machine. Even if a pool of virtual machines has been created and placed in a run ready state, as described in the cross referenced application, the time required to initialize some applications on the virtual machine is prohibitive. The present invention is directed to a method which substantially avoids the above described problem.

SUMMARY OF THE INVENTION

In accordance with the method of the present invention a Virtual Machine Pool Manager is established at the host. The Pool Manager interfaces with the Host Operating system and has two main functions. The first function is to automatically create a pool of virtual machines all of which are placed in a run-ready state and a group of which that are each primed to run the same specified distributed application program. A virtual machine is said to be "primed" when the host resident portion of the distributed application program has been initialized on the virtual machine.

The second major function of the Pool Manager is to assign an LU6.2 request for a conversation with said specified distributed application program to one of said idle virtual machines that has been primed with the host portion of said distributed application.

The Pool Manager also includes a control function that manages the size of the group of primed virtual machines in accordance with a predefined algorithm that reflects the anticipated demand for the specified distributed application program.

The pool manager also establishes a data structure which includes a multi-field entry for each virtual machine in the pool to assist in maintaining the inventory of the VM machines in the pool and the status of each machine.

When the host machine receives a request from a network terminal to start a session involving inter-program communication between complimentary parts of a distributed application program, the pool manager assembles the necessary data that is normally required to establish the session connection. An idle virtual machine from the pool of established virtual machines, is assigned, in response to the request to initiate "a conversation." If the request identifies the application program for which the virtual machines in the group were primed, then an idle virtual machine from the group is assigned to process the conversation request.

When the conversation is completed, the assigned virtual machine is returned to the group to await a new assignment, and is maintained in the "primed" state. The Pool manager monitors the number of virtual machines in the group that are busy and based on established threshold values will either increase or decrease the total number of primed virtual machines that are in the group.

It is therefore an object of the present invention to provide an improved method for executing distributed applications in a data processing network.

A further object of the present invention is to provide an improved method for processing distributed application programs in an SNA type data processing network.

A further object of the present invention is to provide an improved method for processing a distributed application program in an SNA type network employing LU 6.2 protocols, when a relatively large number of end users execute said one application program concurrently from different terminals Objects and advantages other than those mentioned above will become apparent from the following description when read in connection with the drawing.

DESCRIPTION OF THE DRAWING

FIG. 3 illustrates the organization of the various layers of programming that are involved in the SNA network of FIG. 1.

FIGS. 4A and 4B show the relationships between parts of a distributed application program.

DESCRIPTION OF THE PREFERRED EMBODIMENT

Figure 1:
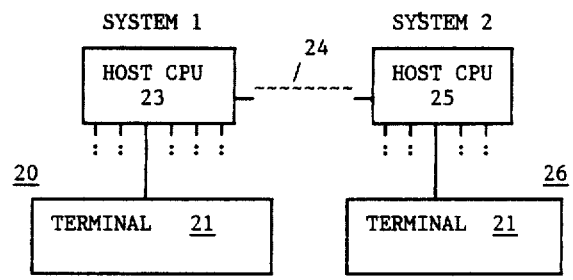
FIG. 1 is a schematic design of a data processing network.
Figure 2:
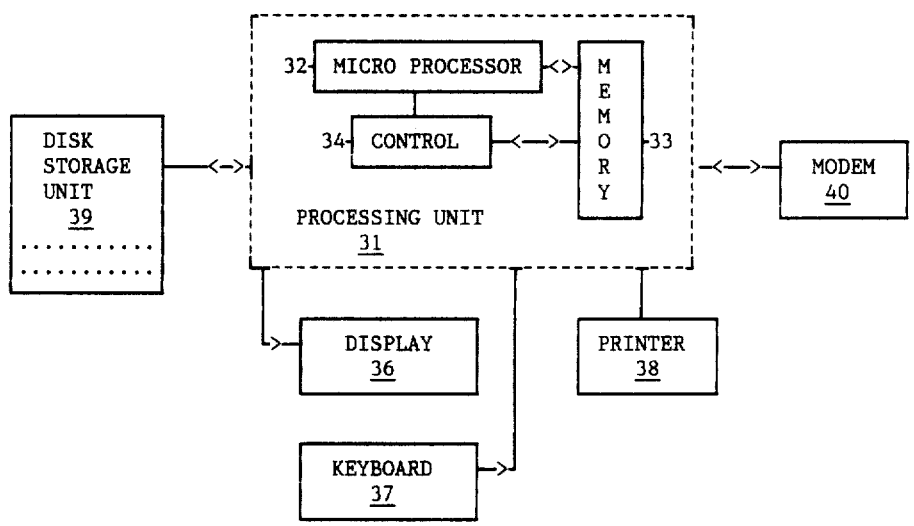
FIG. 2 is a schematic representation of one of the IWS terminals shown in FIG. 1.

FIG. 1 illustrates an information handling system comprising an SNA network 20 of interactive type terminals or Intelligent Work Stations (IWS) 21 of the type shown in detail in FIG. 2. As described, the network includes a plurality of terminals 21 which are interconnected to a host central processing system 23. As shown in FIG. 1, host 23 in turn is connected by communication link 24 to a host processing system 25, which also connects to another SNA network 26 of interactive terminals 21. Functionally, the system operates to allow each terminal or end user to communicate with the host and to one or more other terminals or users using established SNA communication protocols so that the various serially connected communication links are transparent to the users.

The host system includes a host processing unit which may by way of example be an IBM 370 system and a virtual machine type operating system such as the IBM VM or MVS Operating Systems.

It should be assumed that the SNA network shown in FIG. 1 supports two distributed applications referred to as "MAIL" and "CALENDAR" which are available to each terminal user. The MAIL application program allows a user at one terminal to generate a document such as a letter and send that letter to one or more other users at a designated nodes on the network. The sender can store the document in the host system at some logically central system location. Each addressee of the letter has the capability of retrieving that document at a later time by also using the MAIL application program from his terminal. The CALENDAR application functions to maintain an electronic calendar for each terminal user. The CALENDAR application, for example, allows one end user to view other end users' calendars prior to scheduling a meeting in order to determine free periods of those persons being invited to the meeting. Such systems are well known in the art and are currently in extensive commercial use. Since the general organization and operation of such distributed applications is well known, only those details that are necessary for an understanding of the method of processing data in distributed application programs of the present invention will be described.

It should therefore be assumed in the following description that each workstation on the network is an Intelligent Work Station such as an IBM PS/2 personal computing system employing a multi-tasking operating system such as the IBM OS/2 Operating System. It may be further assumed that conventional SNA services to support Logical Unit type LU 6.2 sessions and conversations for distributed applications are provided by the system. The terminal shown in FIG. 1 may therefore process two distributed application programs such as MAIL and CALENDAR concurrently.

FIG. 2 illustrates the functional components of one of the interactive type data processing terminals 21, shown in FIG. 1. The terminal comprises a processing unit 31, which includes a microprocessor block 32, which is, for example, an Intel 80386 micro-processor, a semi-conductor memory 33, a control block 34 which functions to control input-output operations in addition to the interaction between the microprocessor block 32 and the memory unit 33.

The terminal further includes a group of convention peripheral units including a display device 36, keyboard 37, printer 38, a storage unit 39, and modem 40. Since the details of the above described functional blocks form no part of the present invention and can be found in the prior art, only brief functional description of each block is set forth along with the description of their interaction, sufficient to provide a person of ordinary skill in the art with the basis of understanding applicant's improved method of processing distributed application programs concurrently.

Processing unit 31 corresponds, for example, to the system unit of an IBM personal computer such as the IBM PS/2 model 80 system. Unit 31 is provided with an operating system program which may be the IBM multi-tasking OS/2 operating system which is normally employed to run the PS/2 model 80. The operating system program is stored in memory 33 along with the application programs that the user has selected to run. When the system supports a distributed application program such as MAIL or CALENDAR, only one part, e.g., Part A of the distributed application program is stored at the terminal while the other part, Part B, is stored at the host system. Depending on the capacity of memory 33 and the size of the application programs, portions of these programs as needed may be transferred to memory 33 from the disk storage unit 39 which may include, for example, a 40 megabyte hard disk drive and a diskette drive. The basic function of storage unit 39 is to store programs and data that are employed by the system and which may readily be transferred to the memory unit 33 when needed. The function of the diskette drive is to provide a removable storage function for entering programs and data into the system and a vehicle for storing data in a form that is readily transportable for use on other terminals or systems.

Display 36 and keyboard 37 together provide for the interactive nature of the terminal, in that in normal operation the interpretation that the system gives to a specific keystroke by the operator depends, in substantially all situations, on what is being displayed to the operator at that point in time.

In some situations the operator, by entering commands into the system, cause the system to perform a certain function. In other situations, the system requests the entry of certain data generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data. Lastly, the modem 40 functions to transfer data from the terminal 21 of FIG. 2, to a host system through one or more SNA communication links.

FIG. 3 shows the various layers of programming that are employed in an SNA type network. The SNA programming environment is generally considered to consist of seven layers as shown. The top layer as shown is the End User layer and consists of the end user programs. The second layer is called the NAU Services. These services include, for example, presentation services, terminal services and formatting data for specific applications. The third layer is referred to as Data Flow Control. Its function is to maintain send/receive modes and perform high level error correction. The fourth layer is the data Transmission Control layer. Its function involves such things as encryption and decryption plus session level pacing. The fifth layer is the Path Control which does routing, segmenting data units and virtual route pacing. The Data Link layer is the sixth layer. It functions to provide link level addressing, sequencing and error control. The seventh and last layer is the Physical layer which defines for example the pin assignments on connectors for the various signals.

APPC defines the NAU services, Data Flow Control and Transmission Control. As explained on page 306 of the previously referenced IBM Systems Journal, the method of defining the LU 6.2 conversation functions, is in terms of programming-language-like statements called verbs. Documentation with verbs which are completely defined by the procedural logic that generates session flows, provides significantly greater precision than English prose.

Figure 4B:
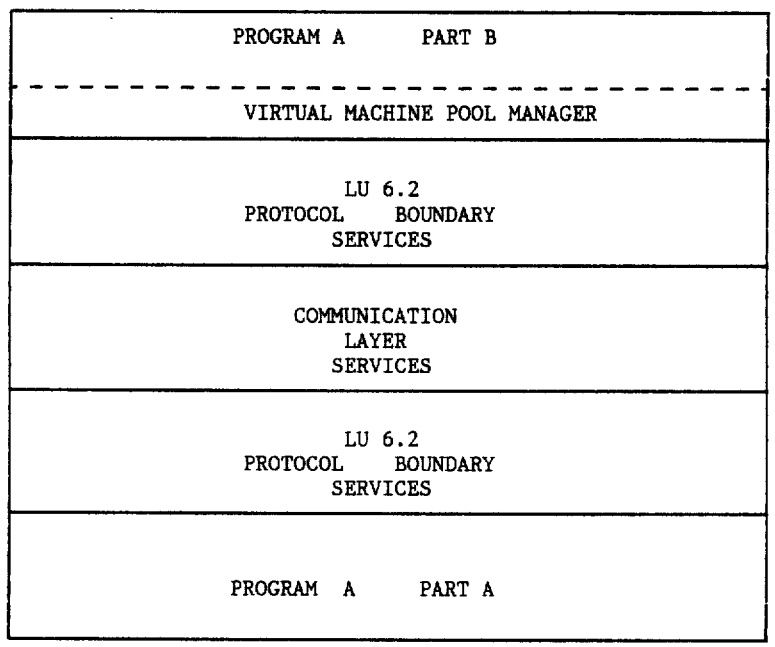

FIG. 4B shows how the verbs define the interaction between transaction programs, i.e., Part A or Part B of the distributed application program, and Logical Units, for conversion resources. A set of verbs is referred to as a protocol boundary rather than as an application program interface. As shown in FIG. 4, the presentation services component interprets verbs and can be thought of as including a subroutine for each verb. The LU resource manager does allocation of conversation resources and assignment of conversations to the sessions, keeping queues of free sessions and pending allocation requests. Its equivalent component in products also allocates local resources in products specific ways. The function of the following LU 6.2 verbs is set forth on page 307 of the previously mentioned IBM System Journal.

The 6.2 verbs discussed are SEND_DATA, RECEIVE_AND_WAIT, PREPARE_TO_RECEIVE, FLUSH, REQUEST_TO_SEND, SEND_ERROR, CONFIRM, ALLOCATE AND DEALLOCATE.

The ALLOCATE verb initiates new activity at another LU by building a conversation to a named partner program. The named partner is placed in execution and given addressability to the conversation that started it. The ALLOCATE verb carries several parameters including the following.

1. LU_NAME. This is the name of the LU at which the partner program is located.

2. TPN. TPN is the Transaction Program Name of the partner program with which the conversation is desired.

3. MODE_NAME. MODE_NAME specifies the type of transportation service that the conversation is to provide. For example, a SECURE, a BULK, or a LOW_DELAY conversation can be requested. The LU uses a session with the appropriate MODE_NAME to carry the conversation.

The target of the conversation is a newly created process or task, which means that the distributed processing in the network at any instant of time, consists of a number of independent distributed transactions, each of which consists of two or more transaction programs connected by a conversation. The DEALLOCATE verb ends the conversation. In as much as each partner may issue DEALLOCATE, a conversation varies from a single short message to many exchanges of long or shot messages. A conversation could continue indefinitely, terminated only be a failure of a Logical Unit or by the session that carries it. Transaction programs are not ended by DEALLOCATE, but continue until they terminate their own execution, end abnormally or are terminated by control operator action.

Both network application programs and service transaction programs use the execution services provided by Logical Units. Service transaction programs run on Logical Units in the same way as other transaction programs. They interact with the human operator or they may run as a pure programmed operator. Many service transaction programs effect only the local Logical Unit. An example is a command to display the current set of active transaction programs.

Other control transactions, especially those that relate to sessions, can effect other Logical Units as well as applications at other Logical Units. For example, a local command to prematurely terminate a transaction that is using a conversation causes the conversation to be ended abnormally, a state change that must be transmitted to the partner Logical Unit for presentation to the transaction program that is sharing the conversation. Or a decision to activate one or more of the sessions shared by the two LUs may be made by one LU operator but must be communicated to the other Logical Unit. Advanced program to program communication for SNA includes several control operator verbs that provide LU to LU control and coordination, especially for activation and deactivation of sessions. When a distributed service transaction program starts at one LU, it creates a conversation to a partner transaction program in a partner LU. The two transaction programs then cooperate to preform the desired control activity.

The IBM VM host operating system includes a component referred to as APPC/VTAM Services (AVS) which is responsible for the APPC protocol boundary support in the Operating System. AVS defines one or more LU 6.2 Logical Units to IBM Virtual Telecommunications Access Method (VTAM). VTAM is the IBM host computer component that manages the communications layer between the host and the various terminals of the network. AVS acts as a bridge for APPC communications to virtual machines within the operating system. For example, when an APPC ALLOCATE verb is received that originated from outside the VM operating system, VTAM will determine if there is a Logical Unit active that corresponds to the LU name specified in the ALLOCATE. AVS will have previously told VTAM that it will handle all traffic for particular LU names. VTAM will find that AVS has defined an LU that corresponds to the LU name in the ALLOCATE verb and pass the ALLOCATE verb to AVS.

There is additional information supplied with the ALLOCATE that is used in this process. Included in the ALLOCATE is a User ID, the identification of the user that the ALLOCATE was submitted in behalf of, and a Transaction Program Name (TPN). The TPN is the application programs to be invoked, that is the Part B of the distributed application such as MAIL. At the time AVS receives the ALLOCATE, it will create a virtual machine and pass the transaction program named in ALLOCATE to an operating system component that is resident in the virtual machine. The operating system component in the virtual machine will activate the named application which then proceeds with various initialization routine after which interaction can occur between the Part A and Part B of the application.

The IWS may be assumed to be provided with a programming organization which allows the terminal to run two application programs concurrently, such as the IBM OS/2 operating system.

Figures 5, 6:
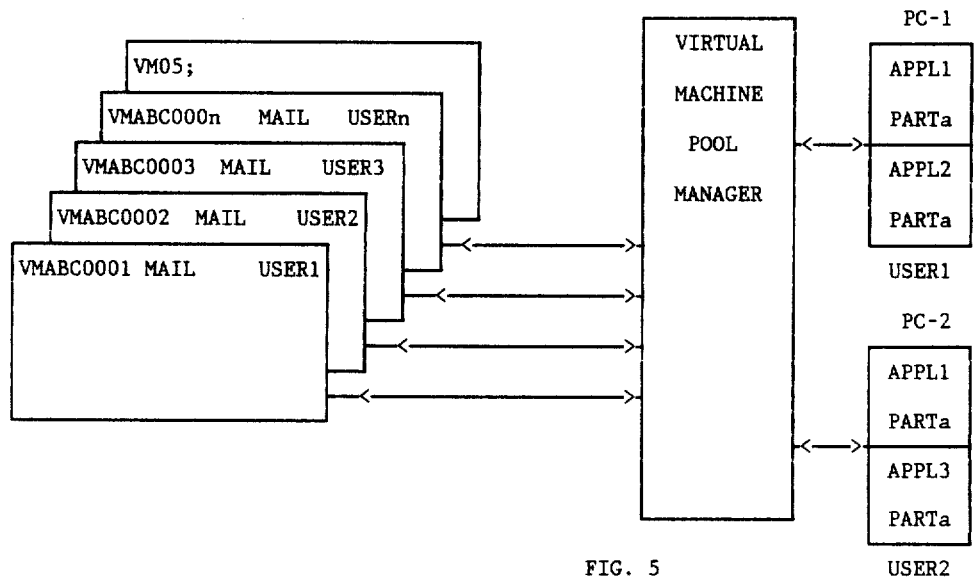
FIG. 5 is a schematic representation of the pool of run ready virtual machines and the group of "primed" virtual machines that are created by the method of the present invention.
FIG. 6 illustrates the details of the virtual machine pool data structure that is employed by the pool manager in managing the pool of virtual machines shown in FIG. 5.

In accordance with the method of the present invention, an additional function, referred to as a VM Pool Manager (VMPM), shown schematically in FIG. 4B, has been added to the LU 6.2 Protocol Boundary services of the prior art. The VMPM operates in the same virtual machine as does the Protocol Boundary services which, in the IBM VM operating system, is called the AVS module. When activated, the VMPM will read a set of installation supplied parameters and create a plurality of virtual machines, as shown in FIG. 5, that are brought to the run ready state. Included in these parameters are the generic names of the virtual machines to be created in the pool. The generic names or virtual machines IDs will previously have been defined to the Operating System's directory of virtual machines. The VMPM issues an Autolog macro for each of the machines. The autolog macro is a known function in the VM operating system. When issued for a particular named virtual machine, it will result in that machine being created and placed in a state such that it is waiting for work, i.e. an assignment to a host resident portion of a distributed application program.

The above described operations are similar to those described in the cross-referenced application. In addition to those operations, the method of the present invention primes a predefined number of virtual machines with the host resident portion of a preselected distributed application program. This step of priming involves selecting a named virtual machine and activating the preselected distributed application program on the selected machine. Activating the program causes the program to initialize itself on the machine to a point that it can respond to the first LU 6.2 ALLOCATE verb that is passed to it from AVS and accept the requested conversation.

The priming process is repeated on virtual machines in the pool until the predefined number of virtual machine have been primed. For example, assume that the network wants 100 virtual machines dedicated or primed to the MAIL application and that when peak hour activity reaches 80 (80%) busy virtual machines, an additional 5 virtual machines be primed and added to the group. If activity continues to increase, add an additional 5 primed machines each time the percentage of busy machines exceeds 80% until there are 200 virtual machines in the group of primed virtual machines. As the load decreases, return 5 primed virtual machines to the pool at a time until the original number 100 is reached.

The information that is supplied to the pool manager at the time the host system is IPLed to create a pool environment such as the one described above is stored at the host. At IPL time AVS is activated and control is transferred to the VMPM. The syntax of the information will vary by operating system, but is generally in the form of the control statement shown below.

1. GLOBAL INFORMATION—POOLNUM=-,POOLID=,MAXUSER=, . . . where

POOLNUM= is the number of virtual machines in the pool. It is also the upper bound of the generic USERID' that are assigned to these virtual machines.

POOLID= is the prefix for the generic USERIDs that are assigned. For example if POOLID is ABC, then the generic USERIDs would range from ABC0001 to ABC0200.

MAXUSER= is the maximum number of virtual machines that can be doing work concurrently for one USERID. Queuing is in effect if that number is exceeded.

2. APPLICATION SPECIFIC INFORMATION—TPN=,TPNNUM=,THRESH= (%,inc,max,time)

TPN= is the name of the application program to be activated when the virtual machine is primed.

TPNNUM= is the number of virtual machines to be primed with the specified application program.

THRESH= is a set of parameters which controls the number of primed virtual machines in the group and allows the pool manager to increase or decrease the number of available primed machines based on an analysis of the current load.

% is the percent of the primed virtual machines in the current group that are actually doing work. When this figure is exceeded, additional virtual machine must be primed.

inc. is the increment of the number of virtual machines that are added when the number of busy machines causes the percent figure to be exceeded.

max is the maximum number of virtual machines allowed in the group of primed virtual machines.

time is the length of time that the number of virtual machines in the group should be kept, after the percent figure drops below the threshold figure. When the percent figure has been below the threshold figure for the stated length of time, the number of virtual machines in the group is reduced by the increment value.

As each machine is successfully created by the Autolog macro, the VMPM will create an entry in a VMPM data structure shown in FIG. 6 representing that virtual machine and its state, When all virtual machines in the list have been created, the VMPM will then proceed to prime the number of virtual machines with the application specific information. After the group or groups of machines have been primed with their respective applications, control is returned the AVS. After the virtual machines have been created and the pool manager has returned control to the AVS, the following scenario occurs.

The terminal operator interactively enters information into his terminal to invoke the distributed application program Mail. As a result of that, the "A" part of the Mail distributed application issues the ALLOCATE verb including the following parameters LU name=LU1,
TPN=MAIL,
USERID=DICKC.

When VTAM receives the ALLOCATE verb, it sees that an LU named LU1 was defined by AVS. It therefore passes control to AVS which passes information to activate the pool manager component of AVS and passes the ALLOCATE information to it. The VMPM by scanning the pool manager data structure determines that MAIL is associated with the group of virtual machines in the pool that have been primed with the MAIL application. During the scanning operation, the pool manager scans each of the entries and looks for one that is available for work and that has been primed with the host portion of the MAIL distributed application program. When it finds an available virtual machine, e.g. VMABC001, it changes the ALLOCATE parameters to the following:

LU NAME=VMABC001,
TPN=MAIL,
USERID=DICKC.

The pool manager changes the LU name, LU1, to the name of the selected idle primed virtual machine MVABC001 in the pool. The pool manager also updates the control block entry that represents the selected virtual machine to show that it is no longer available. The pool manager then places information into the entry in the data structure that reflects the details of the specific task assigned to that virtual machine. The pool manager then re-issues the ALLOCATE verb with the changed LU name.

The VM operating system will then pass the ALLOCATE verb to the virtual machine designated VMABC001 on which the MAIL application has been initialized and change the generic USERID to the USERID specified in the ALLOCATE verb, which in example was DICKC. The conversation is then accepted by the Part B of the application and continues between Part A and Part B of the MAIL distributed application program until DEALLOCATE verb is issued by one of the parts.

Similar interactions of the type described above can occur concurrently from multiple terminals on the network. When the Part A and Part B complete their interaction, either may issue the APPC DEALLOCATE verb to end the conversation. When a DEALLOCATE verb is received, AVS will invoke the pool manager and it will change the entry that represents the virtual machine that was involved. The pool manager will change the status of the virtual machine to an idle state indicating that it is again available for another task. In the idle state, the machine is still in the primed state with the initialized MAIL application program.

The function of managing the number of available virtual machines to meet a varying demand is performed by the pool manager. As explained earlier, selected application programs such as MAIL and CALENDAR are subject to peak demands which are relatively predictable both as to the time period and the number of users that will be requesting access to the particular application program.

The Pool Manager maintains a running count of the number of busy machines running primed applications, by incrementing a BUSY counter each time an idle virtual machine is assigned and by decrementing the BUSY counter each time a virtual machine is released and returned to the pool in the idle state. Each time the counter is changed, the threshold parameters discussed earlier are processed. Several processing approaches are possible to achieve the the overall result to insure that the environment established by the threshold parameters is not exceeded.

Assume that TPNNUM=100 so that 100 machines are initially primed and that the following Threshold parameters have been established; %=80,INC=5,MAX=200,10MIN. After each change of the BUSY counter the value of the counter is compared to product of % times TPNNUM which, under the assumed conditions is, (0.80×100) 80. When the BUSY counter exceeds the 80 busy machine initial threshold value, the Pool Manager creates and primes an additional 5 machines, so that the total number of primed machines in the pool is now 105. When the BUSY counter exceeds a current calculated threshold value e.g. (0.80×105) of 84, another increment of 5 primed machines is created, resulting in a pool of 110 virtual primed machines. If at any time the step of incrementing the number of virtual machines by 5, causes the actual number of machines created to potentially exceed the maximum of 200 machines, only the number of machines required to reach the 200 maximum ceiling will be created. Whenever a new threshold value is calculated in response to adding or subtracting an increment of virtual machines to or from the pool, a timer is reset to zero so that the time that the present size of the pool has been in existence may be determined. Whenever the BUSY counter is decremented in response to a virtual machine concluding a conversation and being returned to the pool and the value of the counter is less than the current calculated threshold, the value of the timer is checked. If the current calculated threshold has not changed in 10 minutes, which was the time parameter initially established, then an increment of 5 idle primed virtual machines are removed from the pool, provided such action does not decrease the pool size below that initially established, e.g. 100.

It will be seen that in accordance with the above process, a single conversation defined by an ALLOCATE and a DEALLOCATE is handled by an assigned primed virtual machine from the pool of primed virtual machines under the control of the Pool Manager. The next conversation would undoubtedly be assigned to a different virtual machine from the pool even when two distributed application programs are being run concurrently from a single terminal with a single user ID in accordance with the method described in the cross-referenced application Ser. No. 261,861. This not only avoids the problem that exists in prior art methods where two distributed application programs originating from the same terminal with the same user ID become serialized within one virtual machine at the host system, but allows both conversations to be processed more efficiently since they are assigned to virtual machines that have already been primed (initialized) with the host resident portion of the application program.

Figure 7:
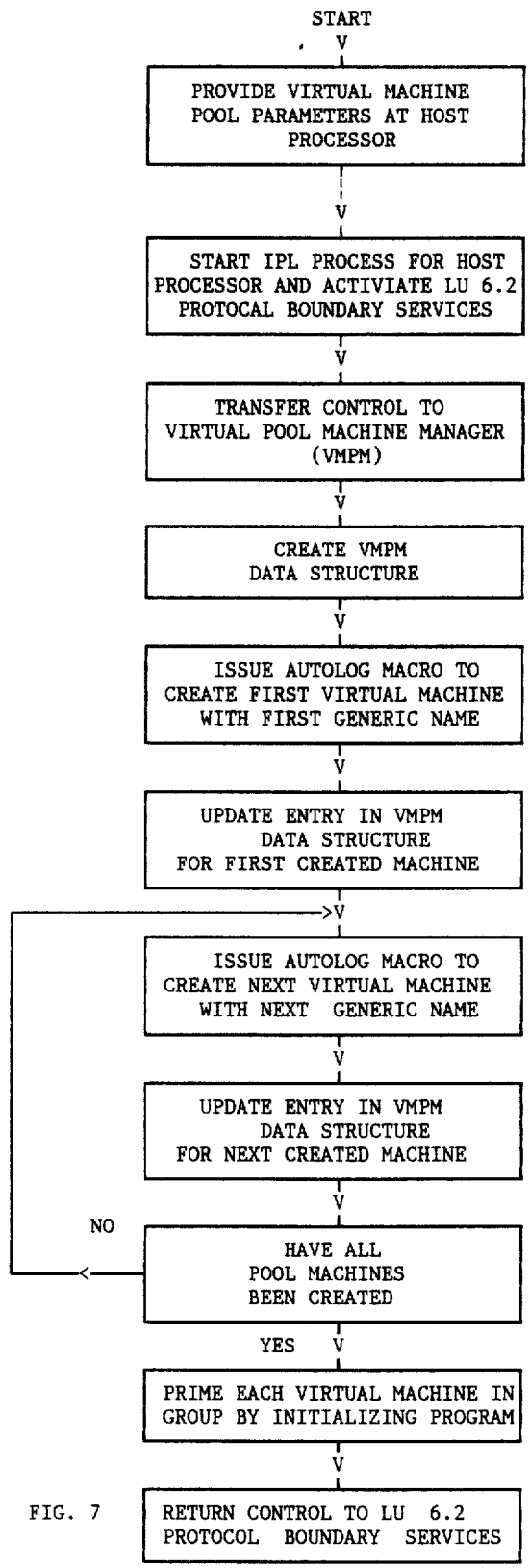
FIG. 7 is a flow chart setting forth the steps involved in creating the pool of virtual machines shown in FIG. 5.

FIG. 7 sets forth a flow chart of the steps involved in creating the virtual machine when the host system is initially IPLed and the steps involved in priming a virtual machine after it has been created. The flow chart of FIG. 7 is self explanatory and effectively summarizes the steps discussed above.

Figure 8A:
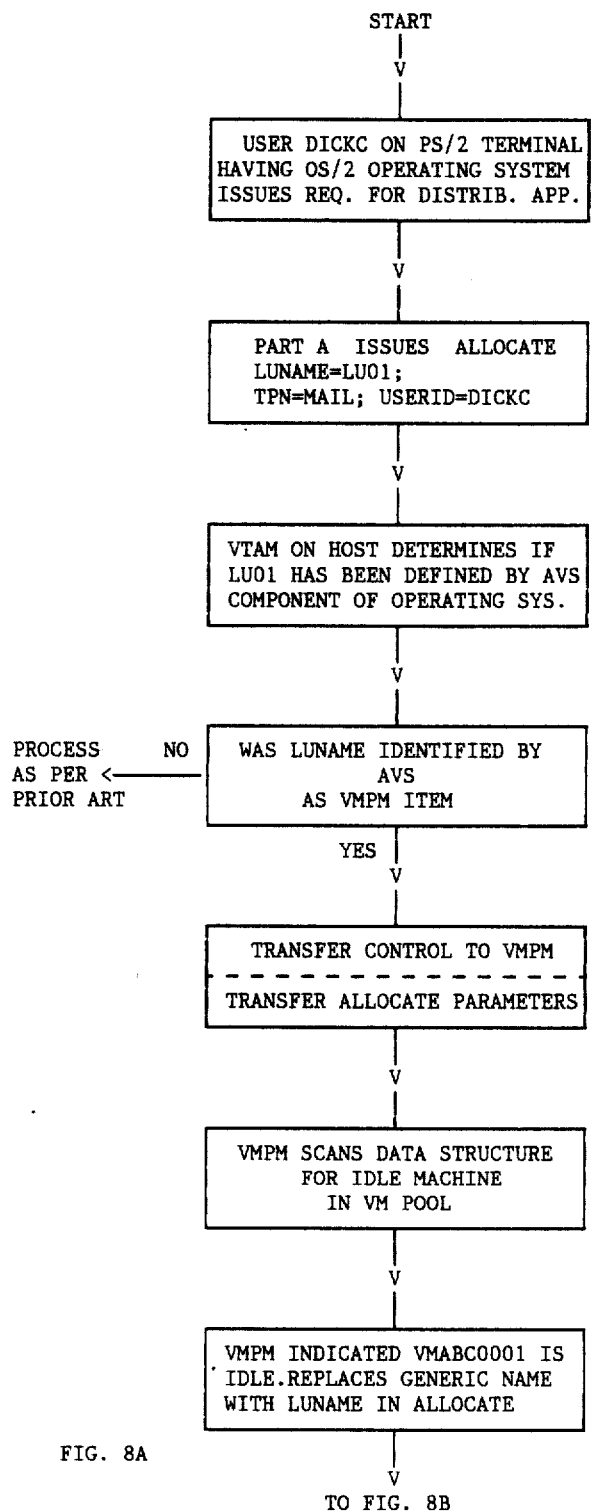
FIGS. 8A and 8B is a flow chart setting forth the steps involved by the pool manager in executing a distributed application program in accordance with the new method.
Figure 8B:
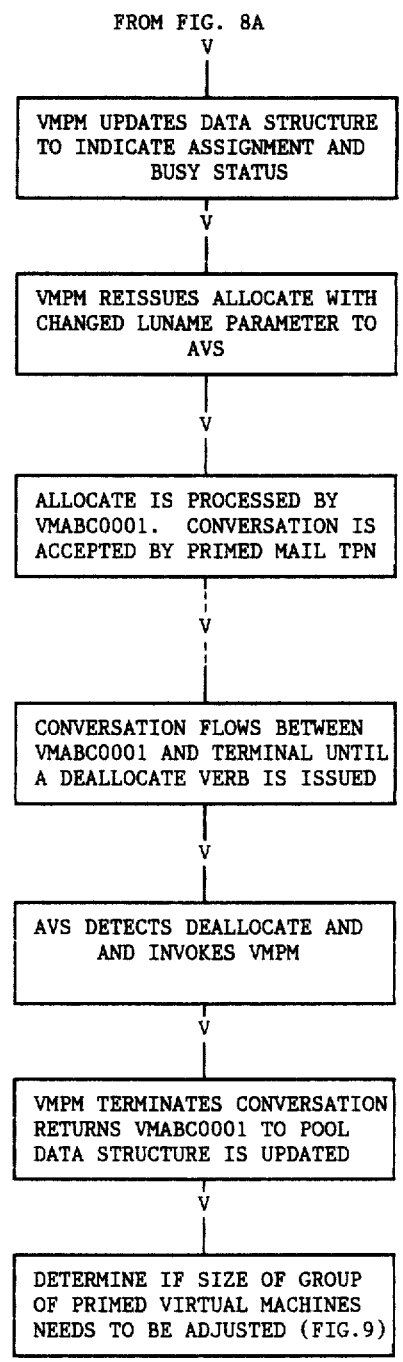

FIGS. 8A and 8B sets forth a flow chart of the steps involved in the program to program communication process between the terminal and the host in accordance with the new method for distributed application programs.

Figure 9:
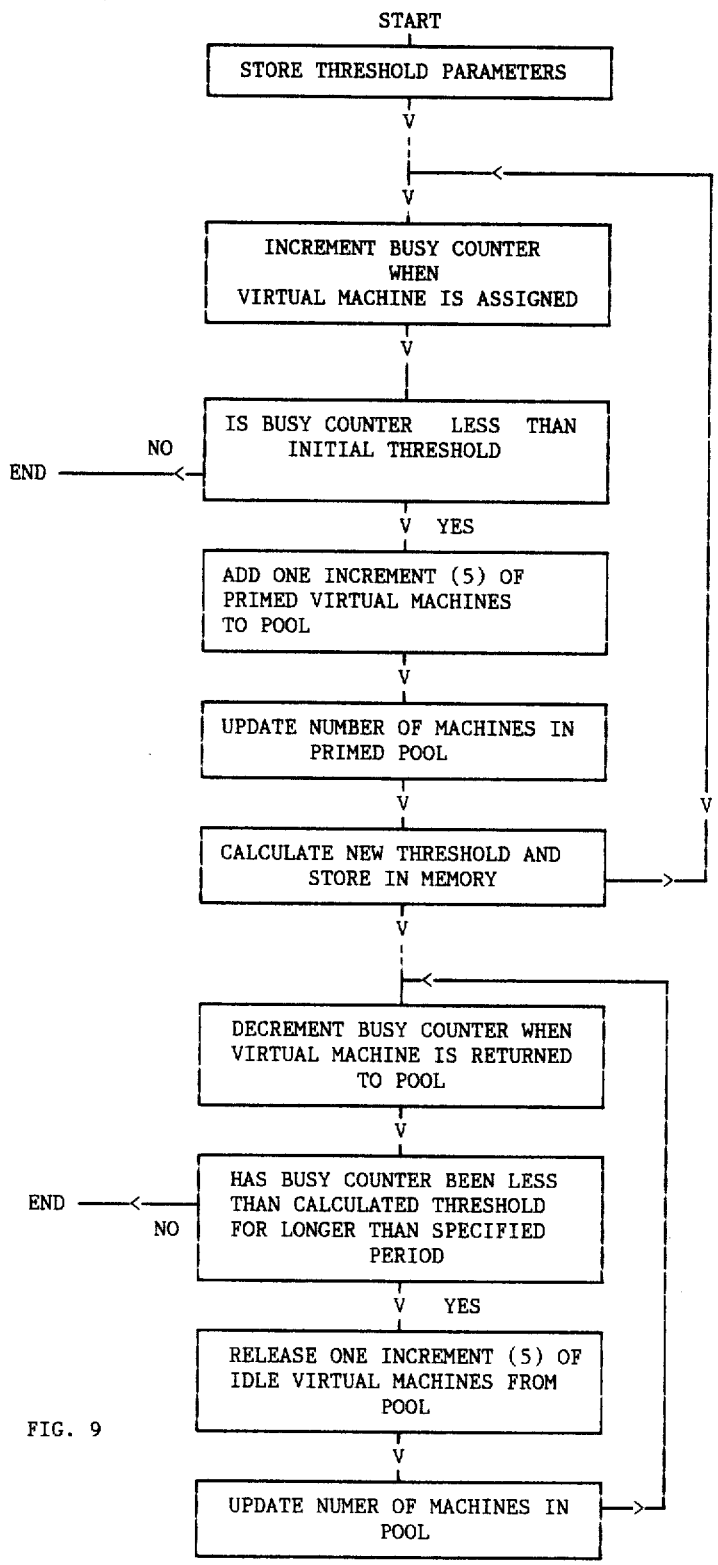
FIG. 9 is a flow chart of the steps involved by the pool manager in managing the virtual machine group size based on actual traffic involving an application program.

FIG. 9 sets forth a flow chart of the pool management process which controls the number of created virtual machines relative to actual/anticipated demand ratios during certain periods of the day.

While the invention has been shown and described with reference to the preferred embodiment, it will be obvious to those persons skilled in the art that changes and modifications may be made without departing from the spirit of the invention or the scope of the appended claims.

For example, it was assumed in the description of the preferred embodiment that the host operating system was the IBM VM Operating System. The manner in which LU 6.2 type protocols interface with the IBM VM Operating System, the manner (and sometimes the terminology) by which virtual machines are created and initialized, etc., will vary from that described in connection with the VM Operating. However, an implementation of the method of the present invention in an environment of a different Operating System is relatively straight forward since the functions of the Pool Manager are in effect transparent to the operating system and the standard process of advanced program to program communication defined by the LU 6.2 protocols. Such changes are therefore considered within the spirit of the present invention and scope of the following claims.

I claim:

1. A method for executing a distributed application program in an SNA type data processing network that supports program to program communication in accordance with SNA Logical Unit 6.2 protocols and in which said application program comprises a first part that is run on one terminal and a second part that is run on a host processor of said network in response to a request to initiate LU 6.2 conversations between said terminal and said host processor involving said program, said method comprising the following combination of sequential steps;

(A) establishing a virtual machine pool manager which functions,
  (1) to create at least two virtual machines at said host processor that are brought to a run ready state prior to receiving said request,
  (2) to prime each said virtual machine by initializing said second part of said application program after said virtual machine has been created and prior to receiving said request, and
  (3) to dynamically assign a primed virtual machine to process said request received from a first said terminal involving said application program so that said request is immediately accepted and a conversation is initiated between said assigned virtual machine and said first terminal, and
  (4) to return said assigned virtual machine to said pool when said conversation has ended to permit a new assignment, and (B) providing a pool manager data structure for use by said pool manager to manage said virtual machines in said pool, whereby said requests for LU 6.2 conversations that are received at said host processor and involve said distributed application program can be assigned to said primed virtual machines and serviced immediately.

2. The method recited in claim 1 in which said host processor has a virtual machine type Operating System including a programming module for automatically creating a virtual machine with a predefined unique identifier at the time said host processor is initialized and said step of establishing includes the further steps of;
(A) storing in said data structure one said unique identifier for each said virtual machine to be created by said pool manager, and
(B) automatically creating each said virtual machine using said programming module at said time said processor is initialized.

3. The method set forth in claim 2 in which said step of providing includes the further step of:
(A) providing a multi-field entry in said data structure for each said virtual machine unique identifier stored in said data structure including providing a name field for storing the said unique identifier assigned to said virtual machine and providing a status field for indicating the status of said machine, and
(B) setting said status field to indicate an IDLE status during said automatically creating step.

4. The method set forth in claim 3 including the further steps of,
(A) priming each said virtual machine by initializing said second part of said application program after said virtual machine has been created and prior to receiving said request.

5. The method recited in claim 4 including the further step of,
(A) issuing a first request from said terminal to said host processor for an LU 6.2 conversation involving said application program, said first request including a USERID, an identification of said application program, and an identification of the Logical Unit to process said first request, and
(B) determining at said host processor if said first request is to be managed by said virtual pool manager by reference to said Logical Unit identification.

6. The method recited in claim 5, including the further step of;
(A) assigning one of said primed virtual machines to process said first request including the steps of:
(1) inspecting said data structure to identify the name of an idle primed virtual machine,
(2) modifying said first request including the step of,
(a) replacing said identification of said Logical Unit with the name of said identified idle primed virtual machine, and,
(3) updating said data structure to indicate said assigned virtual machine is busy.

7. The method recited in claim 6 in which said step of assigning further includes the step of,
(A) reissuing said modified request to said virtual machine identified in said modified request, and (B) changing the name of said assigned virtual machine to the the USERID specified in said first request prior to being modified.

8. The method recited in claim 7 further including the steps of;
(A) executing only one conversation of said application program on said assigned virtual machine, and
(B) returning said virtual machine to said pool for a subsequent assignment of executing another LU 6.2 conversation.

9. The method recited in claim 8 including the further step of,
(A) updating said entry in said data structure to reflect that said virtual machine is again available to process another assignment involving an LU 6.2 request.

10. The method recited in claim 9 in which said step of issuing a request by one part of said application program for a conversation with a said second part of said application includes the further step of;
(A) issuing an LU 6.2 ALLOCATE verb including the name of the Logical Unit, the name of the Transaction Program and the USERID of the entity issuing said request.

11. The method recited in claim 10 in which said step of executing only one said conversation includes the further step of;
(A) issuing an LU 6.2 DEALLOCATE verb with said first or second part of said application program to cause said one conversation to be terminated.

12. A method for executing a distributed application program in an SNA type data processing network that supports program to program communication in accordance with SNA Logical Unit 6.2 protocols and in which said application program comprises a first part that is run on one terminal and a second part that is run on a host processor of said network in response to a request to initiate LU 6.2 conversations between said terminal and said host processor involving said program, said method comprising the following combination of sequential steps:
(A) establishing a virtual machine pool manager which interfaces with an Operating System of said host processor,
(B) creating a plurality of virtual machines at said host processor that are brought to a run ready state prior to receiving said request,
(C) priming each said virtual machine by initializing said second part of said application program after said virtual machine has been created and prior to receiving said request, and
(D) dynamically assigning a primed virtual machine to process said LU 6.2 conversation request received from a first said terminal involving said application program so that said request is immediately accepted and a conversation is initiated between said assigned virtual machine and said first terminal, and
(E) returning said assigned virtual machine to said pool when said conversation has ended to permit a new assignment involving said application program, and
(F) providing a pool manager data structure for use by said pool manager to manage said virtual machines in said pool, whereby said requests for LU 6.2 conversations that are received at said host processor and involve said distributed application program can be assigned to said primed virtual machines and serviced immediately.

13. The method set forth in claim 12 in which said step of establishing said virtual machine Pool Manager includes the further step of,
(A) specifying a control strategy to be implemented by said Pool Manager in which virtual machines in said pool are primed with said second part of said application program in accordance with a mathematical algorithm.

14. The method set forth in claim 13 in which said step of specifying said control strategy includes the further step of specifying said mathematical algorithm to cause said virtual machines to be primed in proportion to said virtual machines that are busy at a specified time.

* * * * *